USE OF RESISTIVE FEEDBACK IN UNBALANCED R-C INTEGRATOR

Filed Feb. 10, 1965 2 Sheets-Sheet 1

INVENTOR.
ROBERT C. CARTER

BY Moody & Anderson
AGENTS

USE OF RESISTIVE FEEDBACK IN UNBALANCED R-C INTEGRATOR

Filed Feb. 10, 1965 2 Sheets-Sheet 2

INVENTOR.
ROBERT C. CARTER

BY Moody & Anderson
AGENTS

United States Patent Office 3,333,117

Patented July 25, 1967

3,333,117
USE OF RESISTIVE FEEDBACK IN UNBALANCED R-C INTEGRATOR

Robert C. Carter, Richardson, Tex., assignor to Collins Radio Company, Cedar Rapids, Iowa, a corporation of Iowa Filed Feb. 10, 1965, Ser. No. 431,664
9 Claims. (Cl. 307—88.5)

ABSTRACT OF THE DISCLOSURE

An electronic integrator providing an effective time constant multiplication realized in a Miller type integrator wherein the R.C. time constant is increased by an effective multiplication of the resistance component rather than the capacitive component. This integrator, unlike the known Miller integrator employs feedback around the resistive element and thus permits one end of the capacitor to be grounded and simplifies recycling by permitting the capacitor to be shorted by switching arrangements working against ground, thus obviating the requirement for floating power supplies.

This invention relates generally to signal integrators and more particularly to an integrator in which the effective R.C. time constant is multiplied appreciably.

In numerous applications of R.C. filters where physical size of components is important, it is known in the art to employ the Miller Integrator configuration in which the effective value of a capacitance is multiplied by the gain of an amplifier so as to provide a large time constant without employing unduly large resistive or capacitive components.

Ofttimes the application of an integrator may necessitate a recycling operation wherein the associated capacitor must be periodically discharged to ready the circuit for a new cycle of integration. Circuitry of this latter type is commonly employed in the data transmission art such as Kineplex data transmission systems wherein the detection principle operates on a synchronous basis and integration of a series of synchronous signal intervals is performed with the integrator being periodically quenched or reset to zero. The Miller type of integrator does not lend itself readily to discharge of the capacitor by simple means, since shorting is normally done by transistor or diode switches and solid state switches of this type, which do not work against ground, are complicated in requiring operating power supplies to be floating.

It is the object therefore of the present invention to provide an electronic integrator of a type providing the effective time constant multiplication realized in a Miller type integrator wherein the R.C. time constant is increased by an effective multiplication of the resistance component rather than the capacitive component.

A further object of the present invention is the provision of an electronic integrator of the type providing an effective time constant multiplication wherein the capacitive element incorporated therein is referenced to ground so as to permit simplified integrator reset.

The present invention is further featured in the provision of utilizing resistive feedback in conjunction with an amplifier in such a manner that the effective value of the resistance is increased by a considerable factor as a function of the amplifier gain.

The present invention is featured in the provision of an integrator including resistive and capacitive elements wherein feedback is employed around the resistor in a manner such that the effective value of the resistance is increased in a circuitry permitting the capacitor to be grounded and thus simplifying discharge or reset operations.

These and other features and objects of the present invention will become apparent from reading the following description in conjunction with the accompanying drawings in which.

The integrator of the present invention, unlike the known Miller integrator circuit, employs feedback around the resistance element of an R.C. integrator rather than the capacitive element, thus "freeing" one end of the capacitor for shorting purposes.

As indicated above, the Miller Integrator is not readily adaptable to a simplified shorting circuitry as concerns the capacitor since both ends of the capacitor are above ground. Shorting the output of the amplifier would not discharge the capacitor. The shorting switch thus must be placed across the capacitor. This necessitates somewhat complicated circuitry since normally, in the interest of design with minimum weight and volume requirements, a transistor or diode switch is employed rather than a direct method, such as by utilizing relay contacts. The solid state switches become complicated when they are required to operate in an ungrounded configuration since, to do so, they require a floating power supply which in turn is generally accomplished by means of an ungrounded transformer secondary winding.

The present invention circumvents the difficulties employed in resetting the known Miller type integrator and retains the advantages thereof by utilizing feedback around the resistor of the R.C. integrator to increase the resistor's effective value. Time constant multiplication is thus realized as in the Miller Integrator with the important added advantage that the capacitor may be grounded, thus permitting simple techniques for discharging or resetting the integrator by shorting the capacitor element.

The present invention might best be comprehended by a consideration of types of R.C. filter circuitry presently employed in the art.

Figure 1:
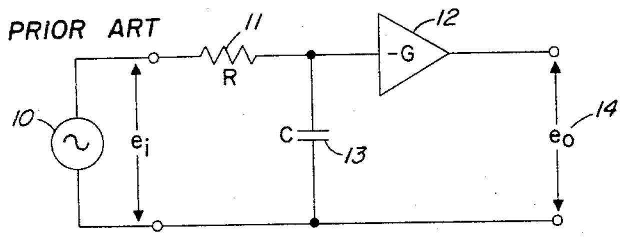
FIGURE 1 is a schematic functional diagram of a prior art integrator and amplifier circuitry.

FIGURE 1 illustrates an elementary R.C. filter comprised of a resistor 11 and capacitor 13 in conjunction with a high input impedance amplifier 12, wherein the output 14 is in the form of the integral of an input signal 10 as based on the time constant of the R.C. network.

The transfer characteristics of the circuitry of FIGURE 1 can be shown to be;

$$\frac{e_o}{e_i}=\frac{-G}{1+RCS} \qquad (1)$$

Figure 2:
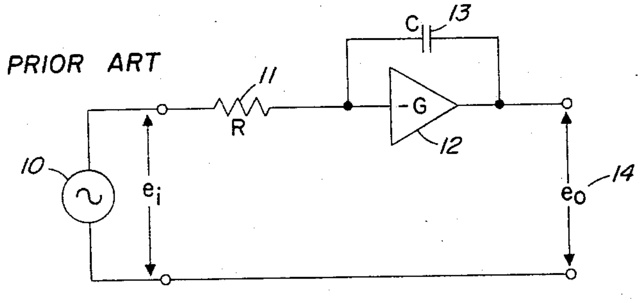
FIGURE 2 is a functional diagram of a prior art R.C. filter configuration employing the Miller Integrator feedback principle.

FIGURE 2 illustrates the known Miller Integrator configuration wherein an input signal 10 is applied through a resistive element 11 to a high input impedance amplifier 12. A feedback capacitor 13 is employed around the amplifier 12. This configuration presents a much higher time constant since the value of the capacitor 13 is effectively multiplied by the voltage gain of the amplifier 12. The transfer characteristic of the circuitry of FIGURE 2 can be shown to be;

$$\frac{e_o}{e_i}=\frac{-G}{1+GRCS},\ \text{for } G>>1 \qquad (2)$$

Figure 3:
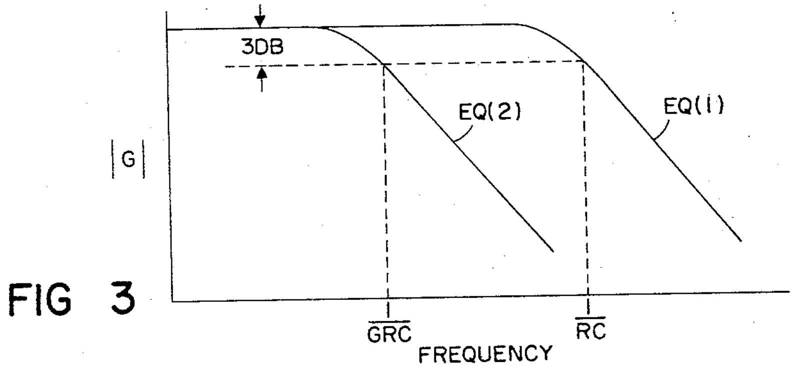
FIGURE 3 represents the Bode plots of the transfer characteristics of the configurations of FIGURES 1 and 2.
Figure 4:
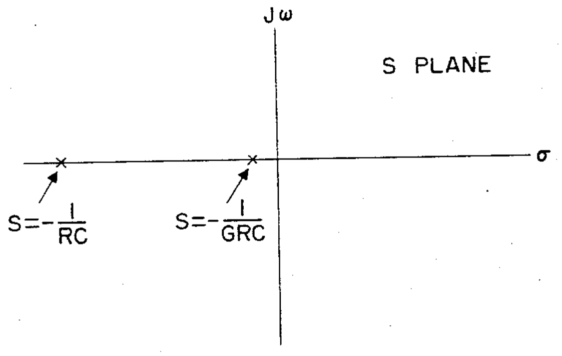
FIGURE 4 is the S-plane plot of the transfer equations of the configurations of FIGURES 1 and 2.

In each of the transfer characteristics of the Equations 1 and 2, G is the voltage gain of the high input impedance amplifier 12. It is noted that the RC time constant in the case of the Miller Integrator, Equation 2, is multiplied by G, whereas it is not so multiplied in Equation 1. The Bode plot of Equations 1 and 2 is illustrated in FIGURE 3 and the S-plane plot for Equations 1 and 2 as shown in FIGURE 4.

The above considerations bear out the known advantage of the Miller type integrator in illustrating that the RC time constant is effectively multiplied by the voltage gain of the amplifier, and thus a large time constant can be obtained with but the use of relatively small resistance and capacitance elements. The Miller Integrator configuration, however, employs the capacitor in a "floating" manner, and the use of the Miller Integrator in a type of operation requiring reset of the capacitor necessitates complicated shorting techniques. It would be of considerable advantage therefore if the time constant multiplication advantage of the Miller Integrator could be realized in a circuit wherein the capacitive element may be referenced to ground, rather than placed in a "floating" configuration. The present invention, as will be further described, retains the advantage of the Miller Integrator while increasing the versatility thereof by allowing the capacitor element to be grounded thus making it relatively easy to discharge or reset.

Figure 5:
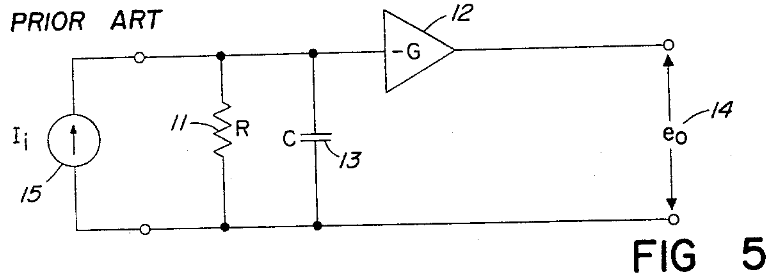
FIGURE 5 is the Norton equivalent circuit of the circuitry depicted in FIGURE 1.

Reference is made to FIGURE 5 which shows a Norton equivalent diagram of the prior art RC filter circuitry of FIGURE 1. The Norton equivalent circuit of FIGURE 5 replaces the constant voltage input generator 10 of FIGURE 1 with a constant current generator 15. The resistor 11 is placed in shunt with the capacitor 13. The transfer (transresistance) equation for the Norton equivalent of FIGURE 5 becomes;

$$\frac{e_o}{I_i}=\frac{-G}{1+RCS} \qquad (3)$$

Figure 6:
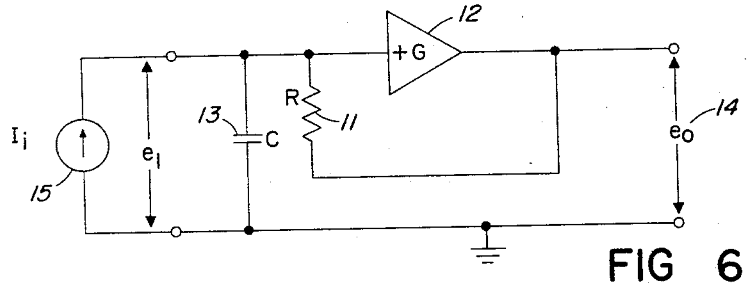
FIGURE 6 is a schematic diagram of an R.C. integrator in accordance with the principles of the present invention.

If the output amplifier 12 of FIGURE 5 is returned to the bottom of resistor 11 and the sign of the gain of the amplifier 12 is reversed, the circuitry of FIGURE 6 is obtained, which represents the basic configuration of an RC integrator in accordance with the present invention. FIGURE 6 shows accordingly a constant current generator 15 shunted by a capacitor 13. The output of the amplifier 12 is returned through resistive element 11 to the input of amplifier 12, and an output 14 is taken between the output of the amplifier 12 and common ground. The transfer equation for the configuration of FIGURE 6 becomes;

$$\frac{e_o}{I_i}=\frac{RG}{1-G+RCS} \qquad (4)$$

If we consider $e_1$, the voltage across the capacitor 13 in FIGURE 6, as being the output voltage, then the transfer characteristic becomes;

$$\frac{e_1}{I_i}=\frac{R}{1-G+RCS} \qquad (5)$$

The comparison of Equations 2 and 5 points out the fundamental analogy between the Miller Integrator type of circuit and that of the present invention (FIGURE 6). The Miller Integrator transfer Equation 2 defines a cut-off frequency $$S_{co}=\frac{1}{GRC}$$

while the present invention transfer Equation 5 defines a cut-off frequency $$S_{co}=\frac{1-G}{RC}$$

Thus in the case of the Miller integrator of FIGURE 2, as the gain of the amplifier approachces infinity, the cut-off frequency approachces zero. In the case of the present invention as illustrated in FIGURE 6, as the gain of the amplifier approachces unity, the cut-off frequency approaches zero. Thus, in order to approach a perfect integration function in the case of the Miller Integrator, the gain of the amplifier should approach infinity. In the case of the present invention, in order to approach perfect integration, the gain of the amplifier should approach unity.

Figure 7:
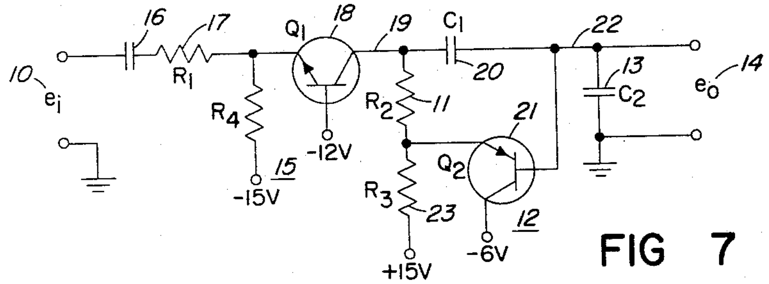
FIGURE 7 is a schematic diagram illustrating a basic practical application of the present invention.

A schematic embodiment of the basic circuitry of FIGURE 6 is illustrated in FIGURE 7. An input signal 10 is applied through a capacitor 16 and resistor 17 to the emitter of a transistor 18. The collector output 19 from transistor 18 is a very high impedance output, (for example, greater than 2 megohms), since the transistor 18 is connected in a grounded-base configuration. Therefore, the transistor 18 and associated circuitry become the constant current source 15 as depicted functionally in FIGURE 6. The collector output 19 of transistor 18 is coupled through a capacitor 20 to the base of transistor 21. Transistor 21 is seen to be connected in a common collector (emitter-follower) configuration and therefore the input impedance of the transistor 21 is very high and its voltage gain approaches unity. Transistor 21 of FIGURE 7 represents the high input impedance unit gain amplifier 12 of FIGURE 6. The actual transfer characteristic of the circuit of FIGURE 7 may be shown to be:

$$\frac{e_o}{e_i}=\left(\frac{\alpha 1}{R_1C_2}\right)\frac{1}{\frac{1}{\gamma_{c1}C_2}+\frac{G_v(1-\alpha_2)}{R_3C_2}+\frac{\alpha 2(1-G_v)}{R_2C_2}+S} \qquad (6)$$

The expression $G_v$ of Equation 6 illustrates the voltage gain of transistor 21 ($Q_2$) of FIGURE 7 and is expressed by;

$$G_v=\frac{\frac{R_2R_3}{R_2+R_3}}{\frac{R_2R_3}{R_2+R_3}+\gamma_{e2}+(1-\alpha_2)\gamma_{b2}} \qquad (7)$$

Letting;

$$\frac{1}{T_1}=\frac{1}{\gamma_{c1}C_2};$$

$$\frac{1}{T_2}=\frac{G_v(1-\alpha_2)}{R_3C_2};$$

$$\frac{1}{T_3}=\frac{\alpha_2(1-G_v)}{R_2C_2};$$

$$\frac{1}{T_T}=\frac{1}{T_1}+\frac{1}{T_2}+\frac{1}{T_3}; \qquad (8)$$

the transfer characteristic Equation 6 simplifies to;

$$\frac{e_o}{e_i}=\left(\frac{\alpha_1}{R_1C}\right)\frac{1}{\frac{1}{T_T}+S} \qquad (9)$$

Consideration of Equation 8 and Equation 9 shows that the reciprocal of the overall time constant, $1/T_T$, is composed of three terms all of which are quite small. The term $1/T_1$ is the contribution of the finite output impedance of transistor 18. The term $1/T_2$ is the contribution by resistor 23 of FIGURE 6. (Resistor 23 is necessary for bias reasons.) This term can be made arbitrarily small by making resistor 23 as high as possible within the limitations of the power supply voltage and the necessary operating current of transistor 18 and also of choosing transistor 21 with an alpha ($\alpha_2$) close to unity.

The term $1/T_3$ is a contribution by the parallel combination of resistors 11 and 23. This term can be made small by choosing values for resistors 11 and 23 as high as possible and also by choosing transistor 21 for low $\gamma_e$ and $\gamma_b$, which, in turn, causes $G_v$ to approach unity.

Figure 8:
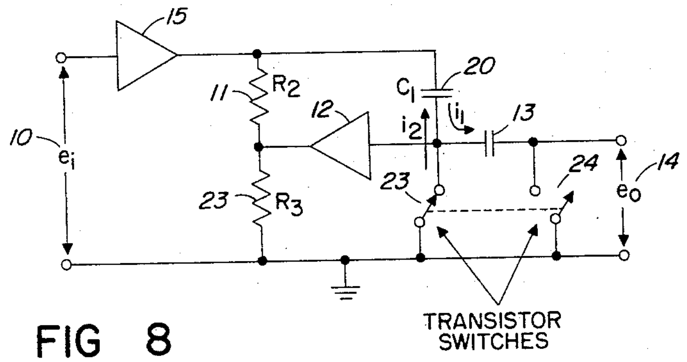
FIGURE 8 is a functional diagram of a circuit in accordance with the present invention illustrating means by which the capacitor of the integrator may be readily discharged.

In order to arrive at the transfer expression of the circuit of FIGURE 7 as expressed in Equation 6 above, two assumptions are made. The collector impedance of transistor 21 must be assumed to be infinite and secondly the capacitor 20 ($C_1$) must be assumed a short circuit. The effect of finite collector impedance of transistor 21 will be similar to the effect of $\gamma_{c1}$ and, therefore, transistor 21 ($Q_2$) should be chosen for a high $\gamma_c$. The assumption that the capacitor 20 is a short circuit is justified by the actual method by which charge is placed upon the output capacitor 13. Considering the circuit of FIGURE 8, the input voltage 10 is actually an A.C. signal, for example 25 k.c. The reactance of the capacitor 20 at this frequency, therefore is quite small. Note that capacitor 13 is connected between the input of the amplifier 12 and a first output terminal, while a second output terminal represents common ground. A pair of switches 23 and 24 shunt both sides of capacitor 13 to common ground when simultaneously closed. If then the switches 23 and 24 are operated in push-pull fashion such that when one is open the other is closed, and the rate of operation is chosen to be the same as the frequency of the incoming signal 10, and assuming switch 24 is closed when the input signal 10 is positive, a current $i_1$ flows, charging capacitors 20 and 13 through switch 24. Upon the next one half switching cycle, switch 23 is closed and the input signal 10 is negative. Current $i_2$ then flows, discharging capacitor 20 through switch 23. The D.C. voltage on capacitor 20 therefore, does not change as capacitor 13 continues to accumulate charge over many cycles. Capacitor 20 is therefore merely a coupling capacitor and does not affect the time constant of the circuit. At the end of an integration cycle, capacitor 13 may be discharged by momentarily closing switches 23 and 24 simultaneously resetting the circuit for another integration cycle.

The switches 23 and 24 may be transistor switches with appropriate complementary gating voltages applied to the respective bases thereof so as to alternately render the transistors conductive for integration purposes. The two gating voltages may be caused to be simultaneously positive for a period following a desired integration cycle to close both switches and discharge the capacitor to reset the circuit for a succeeding integration cycle.

The manner in which the integrator of the present invention provides an RC time constant multiplication might be further considered by assuming the constant current generator 15 of FIGURE 7 is starting to pump current into capacitor 13 which was initially discharged by a previous reset operation. As the voltage accumulation on capacitor 13 becomes higher and higher, the charge would attempt to leak off through resistor 11 (bearing in mind the assumption that the capacitor 20 is considered a short circuit) if it were not for the fact that the "bottom" of resistor 11 is maintained at the same potential that is on the capacitor 13 due to the action of the emitter-follower stage 12. Ideally, there is no potential difference developed across resistor 11, and therefore no signal current flows through resistor 11. In the actual case, however, the signal potential at the "bottom" of resistor 11 is not quite as large as that on capacitor 13, since the voltage gain of transistor 21 is not quite unity. If, for example, the gain of transistor 21 were 0.98, then two percent of the signal voltage would appear across the resistor 11. This has the effect of "multiplying" resistor 11 by 1/1–0.98 or by a factor of 50. The RC time constant of the circuit is accordingly multiplied by a factor of 50.

It is thus seen that the present invention provides a means for multiplying the time constant of an RC network in a manner employing the effective multiplication of the resistive element. The capacitive element of the RC time constant is permitted to be returned to ground and thus simple reset or discharge methods may be employed to reset the integrator of the reference to zero.

The invention accordingly provides a circuit employing the time constant multiplication advantages of the known Miller Integrator while providing increased operational versatility by permitting the integrating capacitor to be referenced to ground.

Although this invention has been described with respect to a particular embodiment thereof it is not to be so limited as changes may be made therein which fall within the scope of the invention as defined by the appended claims.

I claim:

1. An integrator comprising first signal amplifying means to which an input signal is applied, said first amplifying means having a high output impedance, a signal coupling capacitor connected between the output of said first amplifying means and a first output terminal, a capacitive element connected between said first output terminal and common ground, said input signal and first signal amplifier being referenced to said common ground, a unity gain amplifier connected to said first output terminal, the output of said unity gain amplifier connected through a resistive member to the output of said first signal amplifying means, whereby the potential drop across said resistive member is essentially zero and discharge current therethrough from said capacitive means is substantially obviated.

2. An integrator as defined in claim 1 wherein said first signal amplifying means comprises a grounded base transistor amplifier with said input signal being applied to the base-emitter junction thereof; said feedback amplifier comprising a common-collector transistor amplifier configuration, with said resistive member being connected to the emitter elements thereof, the emitter element of said transistor being connected to a source of D.C. power, said second amplifier thereby functioning as an emitter-follower to maintain the potential on the emitter-connected terminal of said resistive element at a potential substantially equal to the accumulated charge on said capacitive element.

3. An integrator as defined in claim 2 where said emitter element of said feedback transistor amplifier is connected to said D.C. power source through a second resistive member wherein the signal potential on the emitter-connected terminal of said first resistive member is equated to the charge on said capacitor element by (1–G) percent thereof where G is the gain of said feedback amplifier, the gain of said first resistance means thereby effectively multiplied by a factor of 1/1–G.

4. A signal integrator as defined in claim 3 further comprising first and second switching means individually connected between the respective terminals of said capacitive element and said common ground, said switching means being adapted to alternately operate in push-pull fashion at the frequency of said input signal to effect a charge accumulation on said capacitive element, said first and second switches being effective to short-circuit said capacitive element and discharge same upon said switches being simultaneously closed.

5. An RC integrator comprising a first high output impedance amplifier to which an input signal is applied, a resistive element and a capacitive element respectively serially connected across the output of said first amplifier and feedback means comprising a second amplifier having essential unity gain shunting said resistive element whereby substantially zero potential drop is developed across said resistive element and discharge current therethrough from said capacitive element is substantially obviated.

6. An RC integrator comprising a first high output impedance amplifier the output of which is referenced to common ground, a ground-referenced input signal applied to the input of said first amplifier, the output of said first amplifier applied through a coupling capacitor to a first output terminal, first and second resistive members respectively serially connected between the output of said first amplifier and said common ground, a feedback amplifier having high input impedance and substantial unity gain connected betwen said first output terminal and the junction between said first and second resistive members, a further capacitive member connected between said first output terminal and said common ground, and an output signal taken across said further capacitive member.

7. An integrator as defined in claim 6 wherein a first switching means shunts said further capacitive element and wherein said further capacitive element has a first terminal connected to said output terminal and a second terminal connected through a second switching means to said common ground, said switching means being adapted to be alternately closed to effect an integration cycle and simultaneously closed for a predetermined period to effect a discharge of said further capacitive element.

8. An RC integrator as defined in claim 7 wherein said first amplifier comprises a grounded-base transistor amplifier with said input signal being applied to the base-emitter junction thereof, said feedback amplifier comprising a common-collector transistor amplifier configuration, the junction between said first and second resistive members being connected to the emitter element of said feedback amplifier, the base element of said feedback amplifier being connected to the junction between said coupling capaictor and said further capacitive element.

9. An RC integrator as defined in claim 8 wherein said second resistive member is chosen with a resistance value as high as possible within the limitations of the necessary operating current of said first amplifier.

References Cited

UNITED STATES PATENTS

| | | | |
|---|---|---|---|
| 2,901,610 | 8/1959 | Brown ------------ | 235—183 X |
| 3,171,986 | 2/1965 | Bonner et al. ------ | 235—183 X |
| 3,218,444 | 11/1965 | Mollinga ------------ | 328—127 |

ARTHUR GAUSS, *Primary Examiner.*

B. P. DAVIS, *Assistant Examiner.*